United States Patent [19]

Fürstenberg

[11] 4,134,745

[45] Jan. 16, 1979

[54] AIR CLEANING APPARATUS

[75] Inventor: Joachim Fürstenberg, Aichwald, Fed. Rep. of Germany

[73] Assignee: LTG Lufttechnische GmbH, Stuttgart, Fed. Rep. of Germany

[21] Appl. No.: 758,723

[22] Filed: Jan. 12, 1977

[30] Foreign Application Priority Data

Jan. 13, 1976 [DE] Fed. Rep. of Germany ....... 2601016

[51] Int. Cl.² .............................................. B01D 46/04
[52] U.S. Cl. ......................................... 55/303; 55/356
[58] Field of Search ................... 55/96, 282, 288, 293, 55/301, 302, 303, 309, 356

[56] References Cited

U.S. PATENT DOCUMENTS

| 1,493,110 | 5/1924 | Diehl | 55/96 |
| 3,423,906 | 1/1969 | Fried | 55/302 |
| 3,608,283 | 9/1971 | Huglo | 55/356 |
| 3,887,341 | 6/1975 | Sutter | 55/96 |
| 3,951,623 | 4/1976 | Furstenberg | 55/96 |

FOREIGN PATENT DOCUMENTS

| 903890 | 12/1953 | Fed. Rep. of Germany | 55/302 |
| 925392 | 2/1955 | Fed. Rep. of Germany | 55/302 |
| 1001465 | 1/1957 | Fed. Rep. of Germany | 55/302 |
| 1009993 | 11/1965 | United Kingdom | 55/302 |

Primary Examiner—Bernard Nozick
Assistant Examiner—David L. Lacey
Attorney, Agent, or Firm—Edwin E. Greigg

[57] ABSTRACT

An air cleaning apparatus for purifying the air in machine rooms, etc., has a filter box and a primary air conveyor therein. When dust and impurities have accumulated on the upstream side of the filter, the normal clean air outlet is closed and the clean air stream is re-directed back onto the filter, thereby tending to dislodge the mat of impurities adhering to the other side. At the same time, a second air conveyor is activated to aspirate air at least partly from the interior of the filter box, thereby carrying along the dislodged mat of impurities for disposal downstream of the second air conveyor.

6 Claims, 7 Drawing Figures

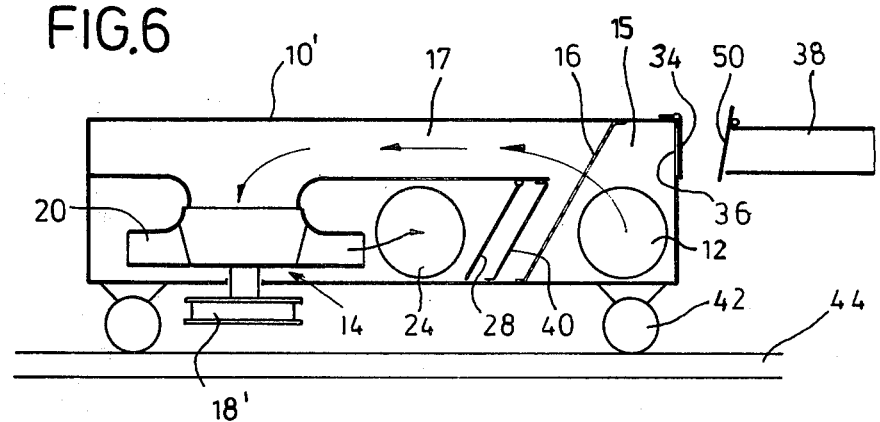
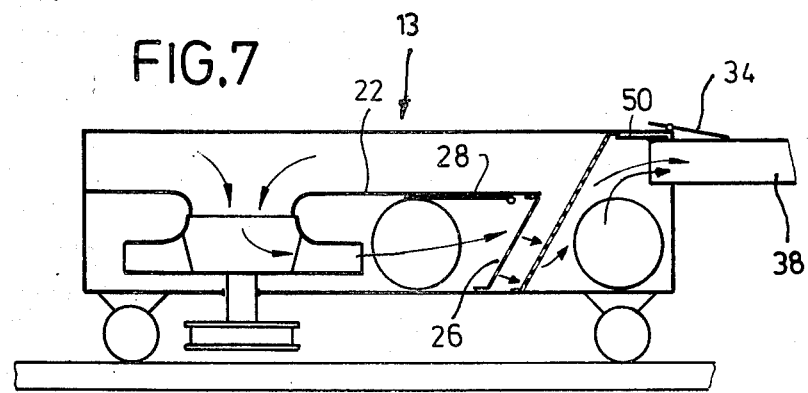

AIR CLEANING APPARATUS

BACKGROUND OF THE INVENTION

The invention relates to a method and an apparatus for cleaning the filters in filtering boxes associated with machines and machine rooms and the like. The filtering box contains a filter and a suction mechanism aspirating air to be cleaned through the filter. For the purposes of cleaning the filter periodically, the apparatus contains a second air transport device which is capable of aspirating air from the region of the box adjacent the clean side of the filter and through the filter, thus carrying along any contaminations or dirt which had accumulated on the impure side of the filter during normal operation. The apparatus is so constructed that, during the cleaning of the filter, the impure air is continuously admitted to the apparatus and is aspirated by the second air transport mechanism. Part of the air aspirated by the first air transporter is returned and blown out of the filter.

In a known process and apparatus of this type, a supplementary air stream was admitted to the filtering box adjacent the clean side of the filter. This additional air was taken from ambient atmospheric air via inlet channels which originated in the outlet apertures of the filter box and were capable of being blocked by suitable mechanisms. This previously known apparatus has the inherent disadvantage that, during the cleaning operation of the filter, the clean side of the filter was subject to contamination by any dirt or impurities carried by the supplementary air stream and these contaminations now deposited on the clean side of the filter would then be blown out in concentrated form at the onset of normal suction operation via the normal outlet openings of the filter.

OBJECT AND SUMMARY OF THE INVENTION

It is a principal object of the invention to provide a filtering apparatus of the general type described above but without the inherent disadvantage of the accumulation of dirt on the normally clean side of the filter during the cleaning. It is a further object of the apparatus of the invention to insure that any air delivered to the clean side of the filter by the primary air transport mechanism is air which is completely filtered.

These and other objects are attained by a method and an apparatus according to the present invention by providing that any supplementary air which is admitted to the clean room of the filtering box is air which had originated in the region of impure air and which had been aspirated by the primary air transport means through the filter to the clean side of the filter.

Thus, according to the invention, the cleaning operation of the filter does not require supplementary air taken from the ambient air and admitted separately into the filtering box. Rather, the only air used during the cleaning of the filter is the normally aspirated air which is to be cleaned and use is made of the fact that the suction forces exerted by the primary air transport mechanism are substantially lower than the forces exerted by an air stream taken from the pressure side of the first air transport mechanism and directed against the clean side of the filter. Preferably, the air stream directed against the clean side of the filter may be divided into several partial jets.

The method and apparatus according to the invention permits loosening of the mat formed by dust and fibers accumulated on the impure side of the filter, at least in certain predetermined regions, until these loosened portions of the mat are drawn into the air stream generated by a second air transport mechanism. As a consequence, the entire dust and fiber mat is lifted from the filter, preferably as a single entity, and is transported to a collecting device, for example a container or a special chamber, which needs to be cleaned only infrequently.

The method according to the invention may be practiced advantageously by an apparatus which has a filtering box having at least one inlet through which air carrying contaminants to be cleaned is conducted into the interior of the filtering box. Located within the filtering box is at least one filter and a first air transport assembly which aspirates air through the filter from the outside and is thus located downstream of the filter in the normally prevailing air stream. The first air transport assembly is mounted on an intermediate wall separating the filtering box from an outlet channel. The box also has at least one outlet for cleaned air on the pressure side of the first air transport mechanism. An opening in the intermediate wall which is closable by suitable closure elements permits directing cleaned air back into the filtering box against the clean side of the filter. A second air transport mechanism is so located as to be at least partially downstream of the filter and thus to aspirate air through the filter. The access to the second air transport mechanism may be closed by a suitable mechanism.

The invention is especially characterized in that during the cleaning operation of the filter, the suction side of the first air transport mechanism only receives air which has passed through the filter.

This embodiment of the invention insures that, even during the cleaning operation of the filter, dirt and impurities do not reach the clean side of the filter so that, after the cleaning operation is terminated, such accumulated impurities do not suddenly enter the outlet stream on the pressure side of the first air transport mechanism. A further advantage provided by the apparatus of the invention is that the first air transport mechanism continually operates in cleaned air, thereby reducing the necessity for maintenance and also permitting the use of more sensitive and complicated air conveyors without the danger of operational malfunctions.

A particularly advantageous feature of the invention has been shown to be the provision of a closure element for the outlet from the filtering box during cleaning of the filter and at the same time opening an aperture in the intermediate wall.

In many cases, it is also advantageous to provide a nozzle plate in the path of the returned air leading to the clean side of the filter for dividing the air into individual jets. In this manner, the cleaning action of these sharply focussed air streams is increased.

The invention will be better understood as well as further objects and advantages thereof become more apparent from the ensuing detailed description of three preferred embodiments taken in conjunction with the drawing.

BRIEF DESCRIPTION OF THE DRAWING

FIG. 6 is a diagram of a third exemplary embodiment in normal operation; and

FIG. 7 is the apparatus of FIG. 6 during the filter cleaning operation.

DESCRIPTION OF THE PREFERRED EMBODIMENTS

It should be noted that elements performing the same operation are labeled identically in the various embodiments.

Figure 1:
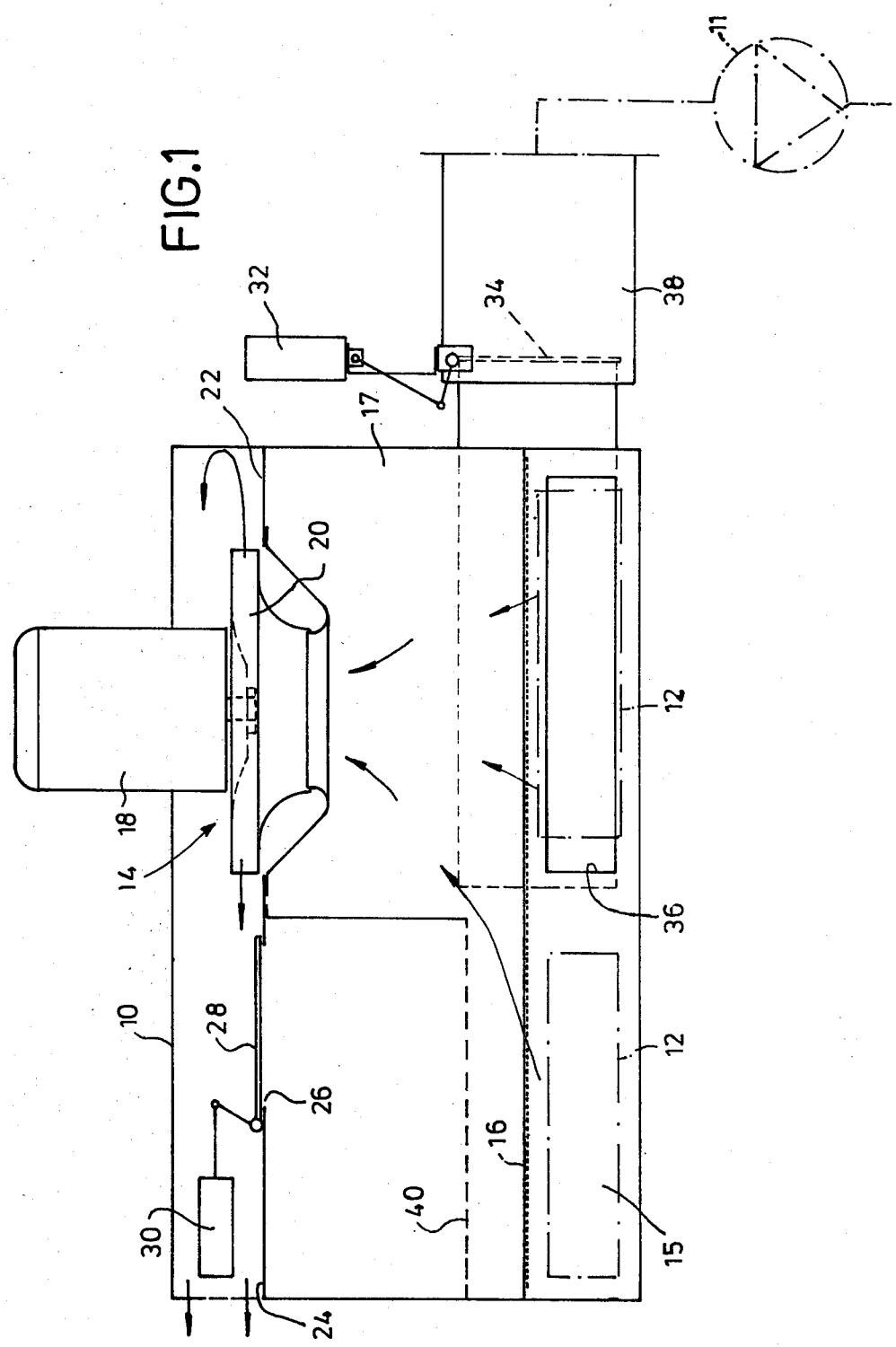
FIG. 1 is a sectional diagram through an apparatus according to the invention illustrating the apparatus in normal operation.
Figure 2:
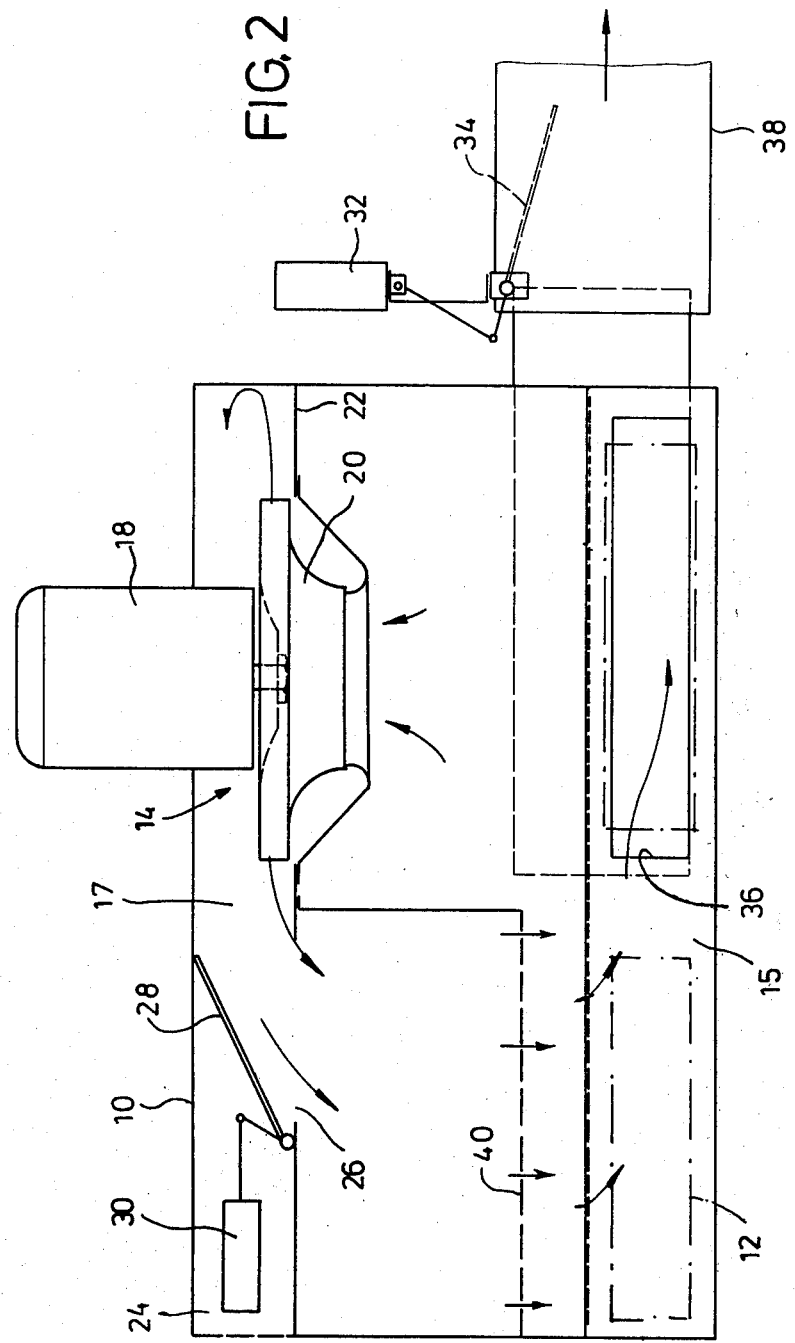
FIG. 2 is a section through the apparatus of FIG. 1 during filter cleaning operation.

Turning now to FIG. 1, there will be seen a filtering apparatus which may be associated with a plurality of textile machines and where the air aspirated from the machines contains pieces of threads, dust, etc. The apparatus includes a stationary filter box 10 and several of such boxes may be used together and connected to a common second air transport assembly 11. FIGS. 1 and 2 illustrate only one such filtering box 10 having two air inlets 12 through which impure air is aspirated through two conduits, not shown.

The impure air flowing into the filtering box 10 through the inlets 12 is moved during normal operation by a first air transport assembly 14 through a filter 16 which, in the illustrated exemplary embodiment, is disposed horizontally and extends over the entire cross section of the filter box 10. Impurities carried by the air are held back at the lower portion of the filter 16, whereas cleaned air flows through the air transport assembly 14 which may be, for example, a radial blower with a fan wheel 20 driven by a motor 18. The fan wheel 20 is disposed in a recess between an intermediate wall 22 and an outer wall of the filter box 10. The intermediate wall thus separates the suction side of the air transport assembly 14 from its pressure side. The pressure volume of the air box has an air outlet 24 through which cleaned air is transported into the surroundings of the filtering box or, alternatively, it is transported through a pressure line, not shown, for any suitable purpose. The directions of the air flow within the filter box are indicated by arrows.

At periodic intervals or whenever a suitable amount of impurities has accumulated at the bottom of the filter 16, the normal operation of the apparatus is interrupted and the process of cleaning the filter 16 is initiated as will be explained with the aid of FIG. 2.

As illustrated in both FIGS. 1 and 2, the intermediate wall 22 has an opening 26 which is closed by a closure member 28 during normal operation of the apparatus. For the purpose of cleaning the filter 16, this closure element 28 is moved from the position shown in FIG. 1 to that shown in FIG. 2 in which it closes the outlet 24 and at the same time opens the opening 26 in the intermediate wall 22. The movement of the closure member 28 takes place with the aid of a first servo element 30 which may be, for example, a pneumatic piston cylinder assembly. At the same time, a second servo element 32 operates a second closure member 34 located in a suction line 38 which causes communication between a suction opening 36 of the impure air space 15 of the filter box and the second air transport assembly 11. If necessary, the opening 26 may consist of several separate openings all closed together by a common closure member 28. When the apparatus is placed in the condition illustrated in FIG. 2, the impure air which continues to flow through the openings 12 into the filtering box also partially enters the suction line 38. At the same time, a portion of the air is transported by the continuously operating first air transport assembly 14 through the filter 16 and back into the clean chamber 17. The air outlet 24 of the filter box being completely closed during the cleaning operation, no air is expelled to the outside so that all of the air aspirated by the mechanism 14 is transported through the opening 26 in the intermediate wall 22 to a jet plate 40, preferably embodied as a perforated plate, and located at a relatively short distance above a portion of the clean side of the filter 16. The sharply defined air jets which are flowing through the suitably round apertures of the plate 40 tend to dislodge the impurities accumulated at the bottom side of the filter 16 which have, after a period of time, been combined into a continuous mat. In this process, the portion of the mat lifted from the filter 16 enters the air stream between the inlets 12, especially the left inlet as shown in FIGS. 1 and 2, and the suction opening 36, and is aspirated into the line 38 in one or more pieces and is removed by the second air transport mechanism 11. This manner of cleaning of the filter 16 is made possible by the fact that the suction exerted by the first air conveyor mechanism 14 on any matted impurities located at the bottom of the filter 16 is substantially smaller than the force of the air flowing through the nozzle plate 40 onto the same impurities. Preferably, as is the case in the exemplary embodiment shown, the nozzle plate 40 may be located substantially closer to the filter 16 than the suction side of the first air transport mechanism. It will be seen that the first air transport mechanism 14 continuously operates during the operation of filter cleaning which itself may be timed by suitable timing switches or in dependence on the pressure difference caused by the accumulating impurities on the filter.

Figure 3:
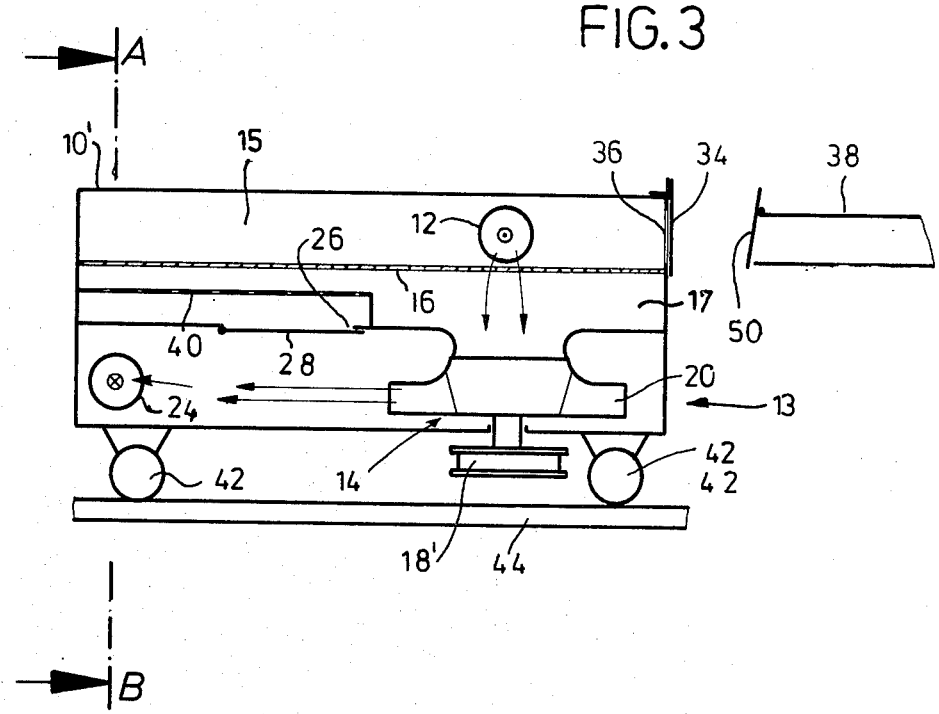
FIG. 3 is a schematic sectional diagram of a second exemplary embodiment of an apparatus of the invention during normal operation.
Figure 4:
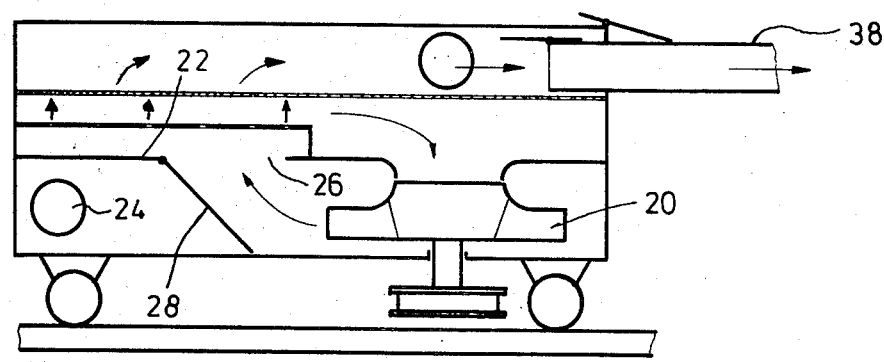
FIG. 4 is the apparatus of FIG. 3 during filter cleaning.
Figure 5:
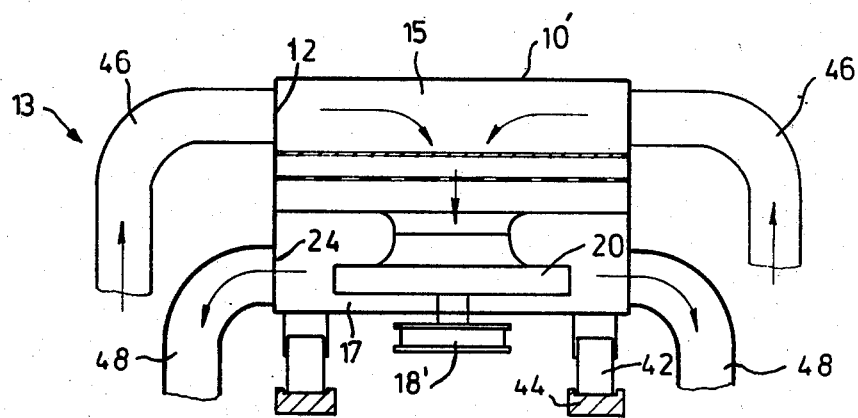
FIG. 5 is a section through the apparatus of FIG. 3 along the line A—B.

The method of this invention, the application of which has been illustrated with stationary filter boxes and by means of FIGS. 1 and 2, may also be used advantageously with so-called traveling cleaners in which the filter box is a part of a traveling mechanism which moves along a textile machine, for example a spinning machine. FIGS. 3–5 are illustrations of an application of the invention to a traveling air cleaner 13. As illustrated in FIG. 3, the filter box 10' has wheels 42 traveling on rails 44. The inside of the filter box 10' again contains a filter 16, an intermediate wall 22 with an opening 26 and an associated closure element 28. Also included are a first air transport mechanism 14 and a nozzle plate 40. All the elements are disposed substantially similarly as in the exemplary embodiment according to FIGS. 1 and 2 except that contaminants accumulate on the top of the filter 16. Furthermore, as shown especially clearly in FIG. 5, the inlets 12 are associated with two opposite suction conduits 46 while two outlets 24 have similar outlet conduits 48. Finally, the first air transporter 14 is driven by an endless belt, not shown, acting via a pulley 18'. During normal operation, as illustrated in FIG. 3, the contaminated air which is aspirated through the suction conduits 46 flows through the filter 16 and after passing through the air transporter 14 flows to the outlets 24 or the outlet conduits 48. During this operation, a suction aperture 36, located adjacent to the side of the filter 16 nearest the inlets 12, is closed by a second closure member 34. Whenever the traveling cleaner has reached the end of its travel on the rails 44, the second closure element 34 opens, and the suction opening 36 receives the terminus of a stationary suction tube 38 while a cap 50 or the like is automatically opened. As before, the suction line 38 communicates with a second air transport mechanism, not shown. At the same time, the first closure element 28 is moved by means, not shown, into the position illustrated in FIG. 4 in which it opens the opening 26 in the intermediate wall 22 while closing the channel between the pressure side of the first air transporter 14 and the outlets 24. From this point on, the cleaning of the filter 16 takes place substantially in the same manner as already explained with respect to FIGS. 1 and 2. The air flow during the normal operation and during the cleaning of the filter 16 is again is indicated by arrows; it will be noted that the operation of FIGS. 3 and 5 corresponds to normal operation.

A third exemplary embodiment of the invention, for carrying out the process described herein, is illustrated in FIGS. 6 and 7 which again show a traveling cleaner 13. In normal operation, as illustrated by FIG. 6, the traveling cleaner 13 is seen to have a filter 16 which is disposed within the filter box 10' in an oblique manner extending from the top to the bottom. The suction openings 36 and the inlets 12 with their suction conduits 46 are located on the right side of the filter as seen in FIGS. 6 and 7, whereas the outlets 24 and the first air transport mechanism 14 are located on the left side of the filter as seen in FIGS. 6 and 7.

During normal operation, the air to be cleaned in the apparatus of FIG. 6 is aspirated by the first air transport mechanism through the inlets 12 and the filter 16. The pressure side of the air transporter 14 has outlets 24. Under those conditions, the opening 26 of the intermediate wall 22 which separates the suction side and the pressure side of the fan 14 is closed by the flap 28. The opening 26 contains a perforated nozzle plate 40.

When the filter 16 is to be cleaned, the two closure elements 28, 34 are placed in the position illustrated in FIG. 7. By contrast to the second exemplary embodiment of the invention, however, the outlets 24 or the blowing conduits 48 remain in communication with the pressure side of the air transport mechanism 14. The excess dynamic pressure on the pressure side of the air transport mechanism 14 serves to generate sharply focussed air streams against the clean side of the filter 16 so as to tend to dislodge the fibrous dust mat from the other side of the filter. Thus, in the exemplary embodiment according to FIGS. 6 and 7, the conduits 48 and the suction conduits 46 remain fully effective even during cleaning of the filter whereas, in the exemplary embodiment according to FIGS. 3 and 4, during the cleaning of the filter 16, only the suction conduits 46 remain effective due to the presence of the second air transport mechanism, not shown but attached to the stationary suction tube 38.

Even though it is usually most advantageous to use all of the air transported by the first air transport mechanism 14 to blow against the clean side of the filter, it may be suitable, in certain cases, only to use portions of the air transported and to use the remaining air for blowing in a different direction and in certain cases even to expel it from the filtering box. Furthermore, it is generally desirable and advantageous if all the impure air is aspirated as during normal operation but it may be suitable, under certain circumstances, to throttle this air stream or even to shut it off. In the latter situation, ambient air may be admitted to the region surrounding the filter at the unclean side thereof, for example through openings in the filtering box which can be closed off in normal operation.

It has been found that, in many cases, the nozzle plate 40 is very advantageous and sometimes necessary. It has also been found, however, that, in many cases, it may be omitted, especially if the cross section of the air stream directed against the filter is not much smaller than the surface of the filter itself, as is the case, for example, in the exemplary embodiment according to FIGS. 6 and 7, wherein the ratio of the surface of the perforated nozzle plate 40 to that of the filter is approximately 1:2. Thus, for example, the nozzle plate 40 may be omitted in the exemplary embodiment according to FIGS. 6 and 7 if the volume of the first air transport mechanism 14 suffices for cleaning the filter under those circumstances.

The foregoing relates to preferred exemplary embodiments of the invention, it being understood that other embodiments and variants thereof are possible within the spirit and scope of the invention, the latter being defined by the appended claims.

What is claimed is:

1. An air cleaning apparatus in which the entire quantity of filtered air is reversed within said apparatus without introduction of ambient air to clean a filter, comprising in combination:

a filter box with at least one dirty air inlet and at least one clean air outlet;

first air transport means, located at least partially within said filter box;

an intermediate wall having a first opening and defining within said filter box two chambers disposed on opposite sides thereof, one of said chambers forming a clean air chamber provided with said at least one clean air outlet, the other of said chambers forming a dirty air chamber provided with said at least one dirty air inlet, said first air transport means being arranged to draw air from said at least one dirty air inlet through said first opening to said at least one clean air outlet;

a filter disposed across said dirty air chamber between said at least one air inlet and said first air transport means;

said intermediate wall having a second opening for the flow of air between said clean air chamber and said dirty air chamber;

first closure means positioned and arranged with respect to said second opening and movable between a first closed position for an air cleaning operation in which dirty air drawn into said dirty air chamber through said at least one dirty air inlet is moved through said filter into said clean air chamber and out said at least one clean air outlet by said first air transport means and a second open position for a filter cleaning operation to close said at least one clean air outlet and to permit air flowing through said filter from said dirty air chamber to said clean air chamber to be returned through said second opening to said dirty air chamber;

second air transport means, attached to said filter box, for aspirating air from the interior of said filter box at least partially through said air filter during the filter cleaning operation; and second closure means for controlling air flow from said filter box to said second air transport means; whereby, during filter cleaning operation, said first and second closure means are opened and at least portions of the air transported by said first air transport means is returned through the filter and is at least partially aspirated by said second air transport means.

2. An apparatus as defined by claim 1, further comprising air stream dividing and directing means, located in said filter box between said filter and said intermediate wall for dividing the stream of air returned through said filter during the filter cleaning operation.

3. An apparatus as defined by claim 2, wherein said air stream dividing and directing means is a perforated plate.

4. An apparatus as defined by claim 1, wherein said filter box is stationary.

5. An apparatus as defined by claim 1, further comprising means for spatial displacement of said filter box.

6. An apparatus as defined by claim 5, including exhaust tube means connected to said at least one clean air outlet.

* * * * *